United States Patent
Mantella

(10) Patent No.: US 10,465,843 B2
(45) Date of Patent: Nov. 5, 2019

(54) ARTICLE FOR ATTACHMENT TO A HINGE FOR HOLDING ITEMS

(71) Applicant: Eneflux Armtek Magnetics, Inc., Medford, NY (US)

(72) Inventor: Anthony R. Mantella, West Islip, NY (US)

(73) Assignee: Eneflux Armtek Magnetics, Inc., Medford, NY (US)

( * ) Notice: Subject to any disclaimer, the term of this patent is extended or adjusted under 35 U.S.C. 154(b) by 0 days.

(21) Appl. No.: 15/915,918

(22) Filed: Mar. 8, 2018

(65) Prior Publication Data

US 2018/0259121 A1    Sep. 13, 2018

Related U.S. Application Data

(60) Provisional application No. 62/469,361, filed on Mar. 9, 2017.

(51) Int. Cl.

| | |
|---|---|
| *A47G 1/17* | (2006.01) |
| *F16M 13/02* | (2006.01) |
| *F16B 1/00* | (2006.01) |
| *H01F 7/02* | (2006.01) |
| *E05D 11/00* | (2006.01) |
| *F16B 45/00* | (2006.01) |

(52) U.S. Cl.
CPC ............ *F16M 13/022* (2013.01); *E05D 11/00* (2013.01); *E05D 11/0054* (2013.01); *F16B 1/00* (2013.01); *H01F 7/02* (2013.01); *H01F 7/0252* (2013.01); *F16B 45/00* (2013.01); *F16B 2001/0035* (2013.01)

(58) Field of Classification Search
CPC ......... F16M 13/022; F05D 11/00; F16B 1/00; F16B 45/00; F16B 2001/0035; H01F 7/02
USPC ............ 248/206.5, 301, 304, 213.1; D8/327; 16/223; 211/119.004
See application file for complete search history.

(56) References Cited

U.S. PATENT DOCUMENTS

| | | | |
|---|---|---|---|
| 69,587 A | 10/1867 | Putnam | |
| 239,465 A * | 3/1881 | Delany | |
| 914,697 A | 3/1909 | Bryant | |
| 1,208,986 A | 12/1916 | Krodel | |
| 2,128,596 A | 8/1938 | Redin | |
| 2,509,502 A | 5/1950 | Hunt | |
| 2,896,791 A | 7/1959 | Raber | |
| 3,044,630 A | 7/1962 | Szabo | |
| 4,372,450 A * | 2/1983 | Licari | A47G 25/0678 211/106.01 |
| 5,411,231 A | 5/1995 | Buck | |
| 6,050,427 A | 4/2000 | Loveland | |
| 6,658,696 B2 | 12/2003 | Buckelew | |
| 7,922,135 B2 * | 4/2011 | Granata | B60R 13/0206 248/205.3 |
| 9,463,903 B2 | 10/2016 | Garrett, Sr. et al. | |
| 2007/0176069 A1* | 8/2007 | Mitchell | A47G 23/0225 248/311.2 |
| 2007/0272637 A1 | 11/2007 | Rigas | |
| 2014/0332619 A1 | 11/2014 | Yang | |

(Continued)

FOREIGN PATENT DOCUMENTS

JP        2006296643 A   * 11/2006

*Primary Examiner* — Gwendolyn W Baxter
(74) *Attorney, Agent, or Firm* — Breiner & Breiner, L.L.C.

(57) ABSTRACT

An article for attachment to a hinge for holding items is disclosed. The article includes a magnetic member for attachment to a door hinge.

12 Claims, 4 Drawing Sheets

(56) References Cited

U.S. PATENT DOCUMENTS

2016/0061380 A1* 3/2016 Smith .................. F16M 13/022
 248/558
2016/0102809 A1* 4/2016 Kikuchi .................. F16B 45/00
 248/206.5

* cited by examiner

ARTICLE FOR ATTACHMENT TO A HINGE FOR HOLDING ITEMS

RELATED APPLICATION

This application claims benefit of U.S. Provisional Application Ser. No. 62/469,361, filed Mar. 9, 2017, entitled "Article For Attachment To A Hinge For Holding Items," and incorporated herein by reference in its entirety.

FIELD OF THE INVENTION

The present invention relates to an article for attachment to a hinge for holding items. More specifically, the invention is directed to an article having one or more magnets for attachment to a door hinge.

BACKGROUND OF THE INVENTION

Various hooks for holding items are known in the art such as disclosed in the following patent documents: U.S. Pat. Nos. 9,463,903; 6,658,696; 6,050,427; 5,411,231; 3,044,630; 2,896,791; 2,509,502; 2,128,596; 1,208,986; 914,697; 69,587; US 20140332619A1; and US 20070272637A1. These devices have various shortcomings addressed by the present invention.

SUMMARY OF THE INVENTION

A primary object of the present invention is to provide an article for attachment to a hinge for holding items.

Another primary object of the present invention is to provide an article having one or more magnets for attachment to a door hinge or other hinge for holding items.

The invention is directed to an article for attachment to a hinge for holding items. More specifically, the invention is directed to an article having one or more magnets for attachment to a door hinge or other hinge. The article may have an arc profile which mates with the door hinge, although other profiles may be used. The article may include a hook or other article for holding items, including a hook for holding clothes, an elongated member for holding pants or other clothing, a spice rack or other articles. The article is capable of holding items of substantial weight due to the nature of the specific magnets, including neodymium magnets.

The article is designed to be used, among other things, as a clothing or towel hook behind doors where conventional screw-in hooks are not desired. The article is useful for louvered doors, glass doors or metal doors or in rental areas where screws are not allowed. The article is also useful as an extra hook or other attachment behind a door already having a fixed hook when additional hanging space is required. The article has a magnetic base which fits snugly around any size hinge. The base is preferably comprised of an arc shaped plastic member having neodymium magnets. The article is extremely durable and may hold over 30 pounds of towels, clothing or other items.

The article may comprise decorative hooks in many different finishes, such as silver, brass, black, white or other finishes. The hook may be held up by an arc shape holding fixture having a strong array of high powered magnets and designed to provide excellent holding power and having a high amount of shear strength.

The present invention is directed to an article for attachment to a hinge for holding items comprising a member for holding items, an arc shaped member or other shaped member attached to said member for holding items and one or more magnets attached to said arc shaped member or other shaped member, wherein the article is adapted to attach to a hinge.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Figure 1:
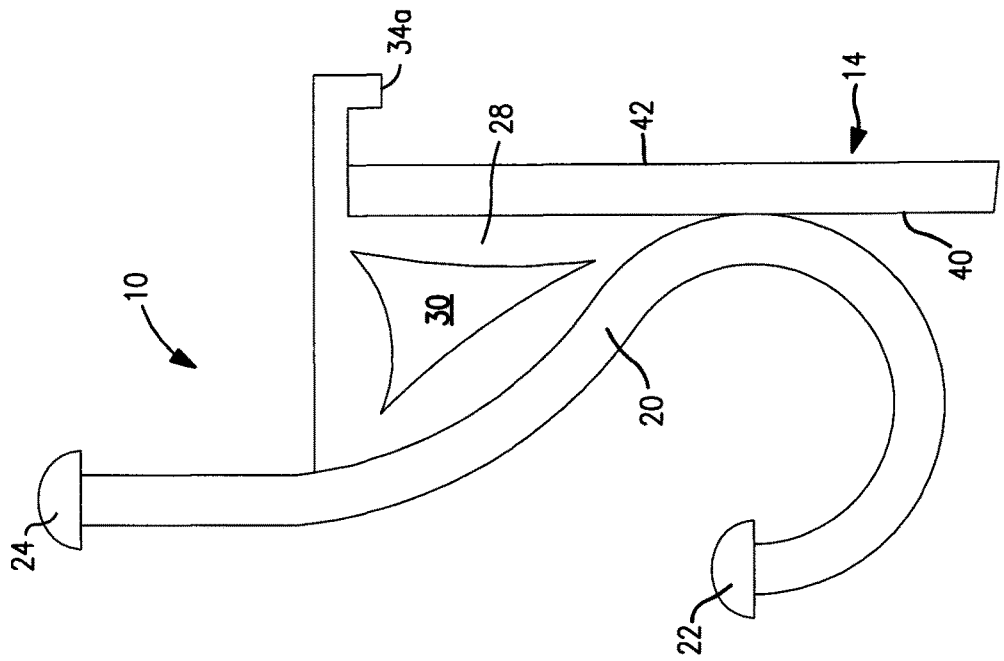
FIG. 1 is a perspective of the present invention.
Figure 2:
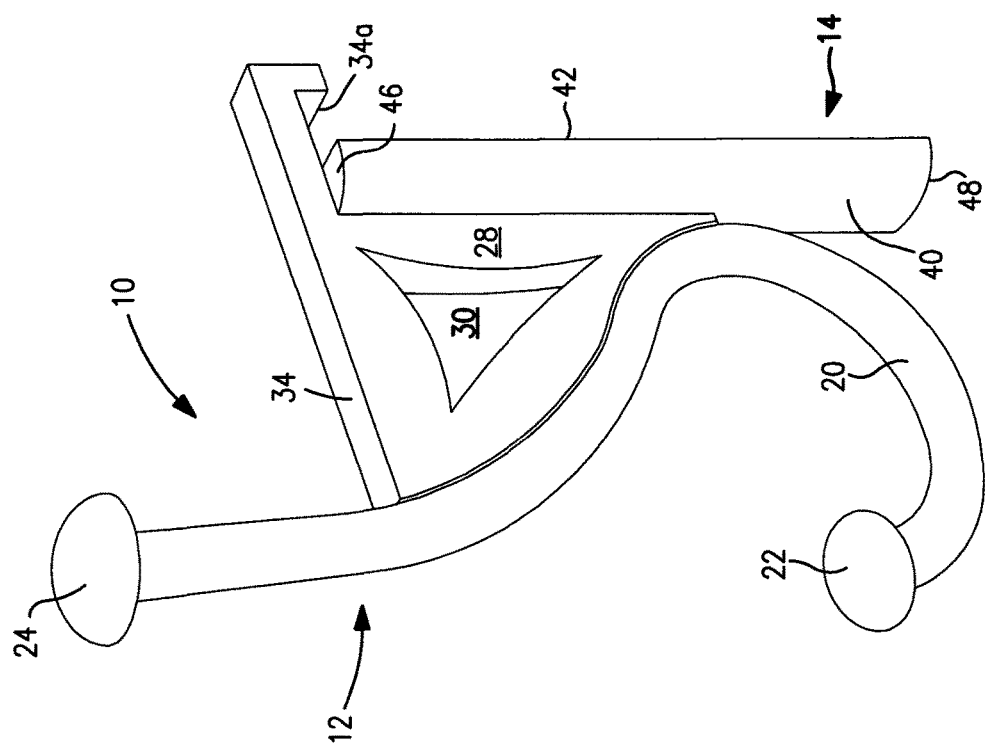
FIG. 2 is a side view of the invention of FIG. 1 showing the hook and arc shaped member.
Figure 3:
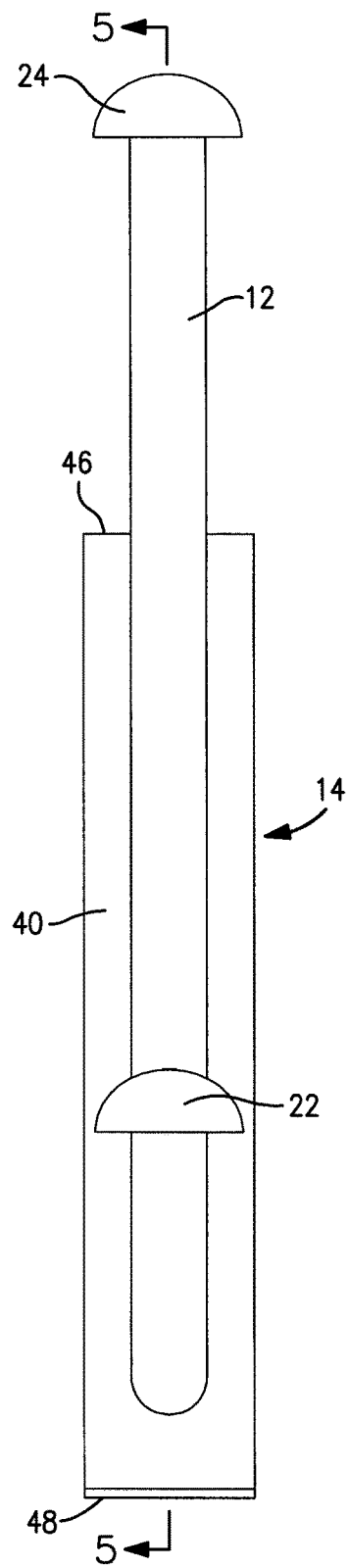
FIG. 3 is a front view of the present invention of FIG. 1.
Figure 4:
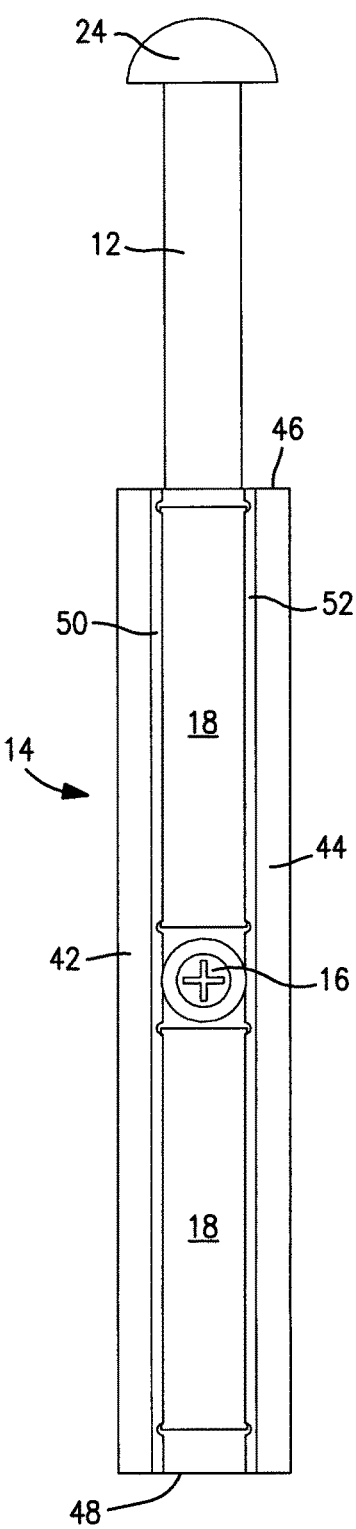
FIG. 4 is a back view of the present invention of FIG. 1.
Figure 5:
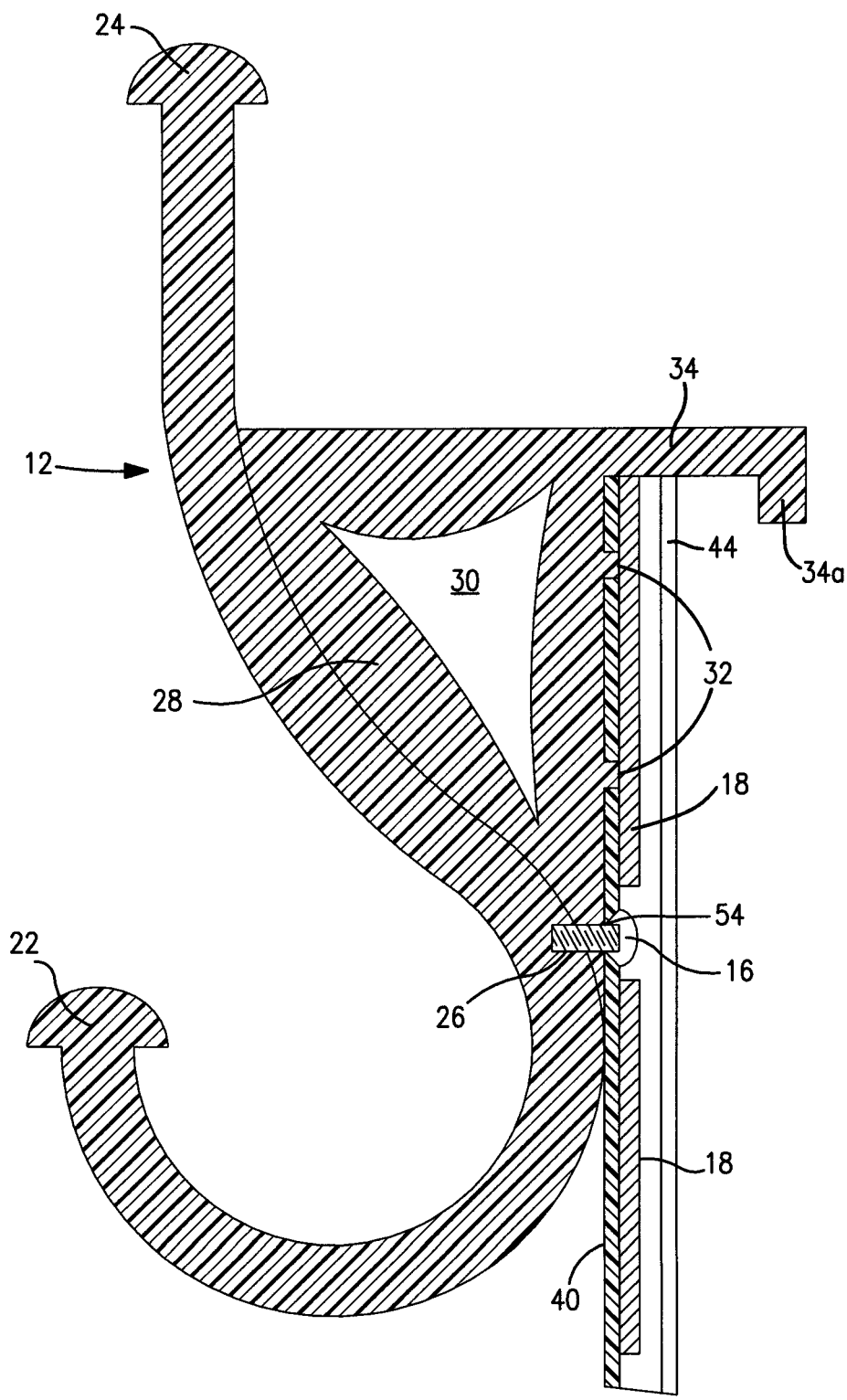
FIG. 5 is a cross-section view of the invention taken along lines 5-5 of FIG. 3.

The invention is directed to an article for attachment to a hinge for holding items. In one preferred embodiment, the hinge is a door hinge. For purposes of this description of a preferred embodiment of the invention, the invention will be described for an article for attachment to a door hinge with the understanding that the article may be useful with other hinges. Further, the member for holding items will be discussed as a hook with the understanding that other items may be used other than a hook. As set forth above, the article is capable of holding items of substantial weight due to the nature of the type of magnet used in the invention.

A preferred embodiment of the invention will now be described. Referring to the Figures, the article for attachment to a hinge for holding items comprises article 10 having a hook 12; an arc shaped member 14 attached to hook 12 by a screw 16; and magnets 18 secured in arc shaped member 14. The magnets 18 are preferably neodymium magnets. It is understood that a single magnet or a plurality of magnets may be used without departing from the scope of the invention.

Figure 6:
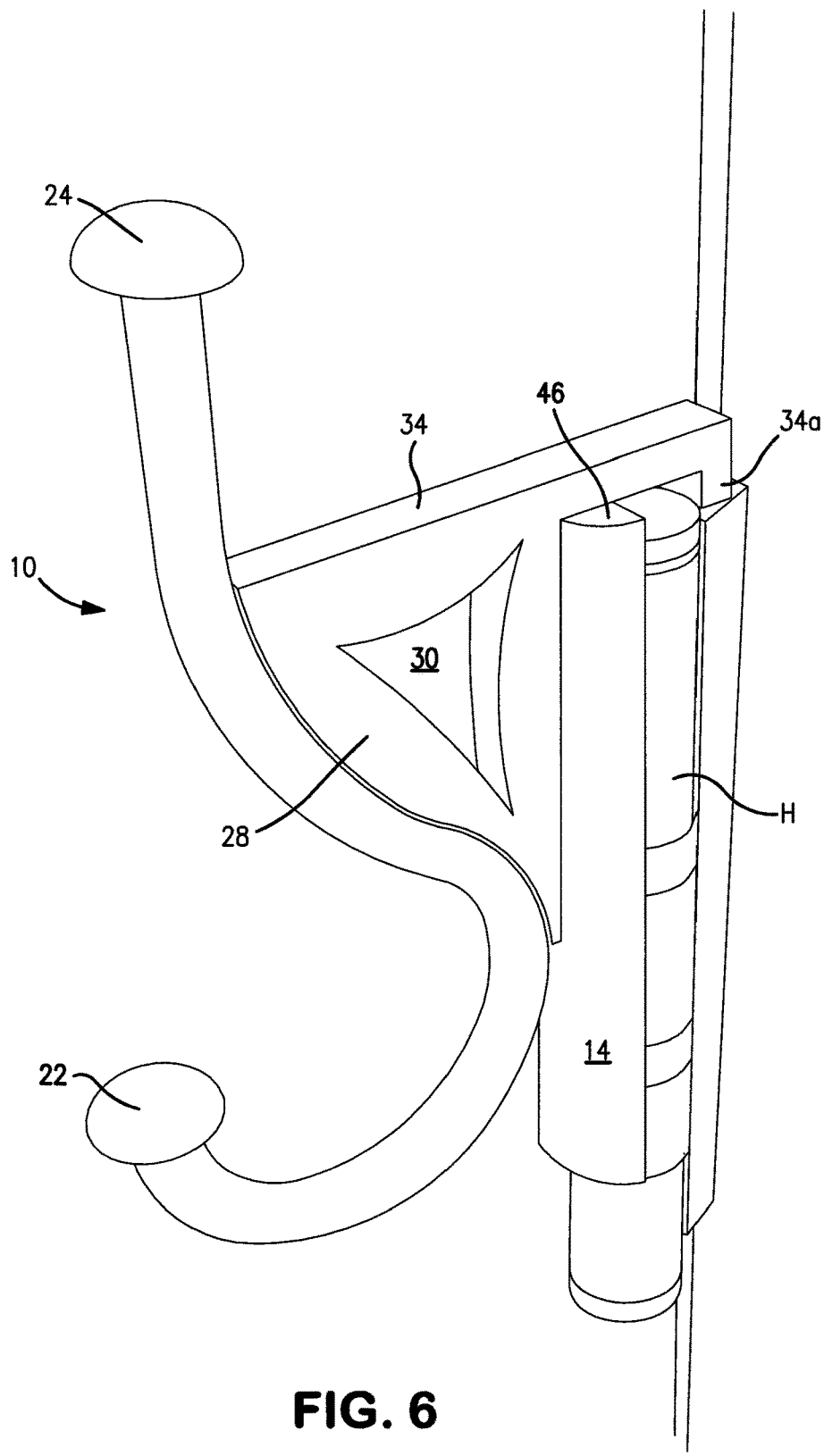
FIG. 6 is a perspective view of the present invention of FIG. 1 attached to a door hinge.

Hook 12 includes a J-shaped portion 20 having a first hook end 22 and a second hook end 24. Hook 12 includes an opening 26 with threads (not shown) for receiving a screw 16 to attach hook 12 to arc shaped member 14. Hook 12 further includes a generally triangular shaped member 28 for attachment to arc shaped member 14. There is an opening 30 in member 28. Triangular member 28 includes pins 32 for attachment to corresponding apertures in arc shaped member 14 to aid the securing hook 12 to arc shaped member 14. Additionally, extending horizontally from triangular member 28 is a horizontal L-shaped member 34 which sits atop arc shaped member 14 and is constructed and arranged for the L-shaped end portion 34a to seat behind a hinge H as shown in FIG. 6. Hook 12 is preferably made of plastic by injection molding. However, it is understood that other materials may be used to make hook 12. Preferably, hook 12 is a unitary member although it may be comprised of separate components. It is further understood that hook 12 may comprise a number of different shapes without departing from the scope of this invention. Additionally, hook 12 may be secured to arc shaped member 14 by one or more screws 16 or by other fastening means as known to those skilled in the art, e.g. adhesives.

Arc shaped member 14 is preferably made of plastic, although other materials may be used such as metal. Arc shaped member 14 is generally U-shaped having a back 40, side walls 42 and 44 and top and bottom walls 46 and 48, respectively. Arc shaped member 14 will include one or more magnets 18. In a preferred embodiment, there are two magnets. However, one magnet may be used or a plurality of magnets, e.g. six magnets. In a preferred embodiment, arc shaped member 14 includes retaining members 50 and 52 extending from side walls 42 and 44 to hold the magnets in place. In a preferred embodiment, arc shaped member 14 is injection molded. The injection mold includes a mold for making arc shaped member 14 and includes mold portions to form members 50 and 52. Magnets 18 are placed in the mold and the plastic forms retaining members 50 and 52 to secure the magnets 18 in an arc shaped member 14. Member 14 includes an opening 54 for receiving a screw 16 for screwing into opening 26 of hook 12. It is understood that other means for attaching hook 12 and arc shaped member 14 may be used such as adhesive or multiple screws.

The presently preferred embodiment for holding magnets 18 is arc shaped member 14. However, other members may be used for retaining magnets 18 and attachment to hook 12 or other article holder.

FIG. 6 illustrates article 10 attached to a conventional door hinge H. It is understood that the invention may be useful for attachment to other hinges and the other items may be used instead of hook 12 to hold other items.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An article for attachment to a hinge of a door for holding items comprising a member for holding said items, an arc shaped member having a recessed area attached to said member for holding said items and one or more magnets attached in said recessed area of said arc shaped member, wherein said article is adapted to attach to said hinge of a door.

2. The article of claim 1 wherein the member for holding items comprises a hook.

3. The article of claim 2 wherein the hook includes a first hook end and a second hook end.

4. The article of claim 2 wherein the hook includes a horizontal L-shaped portion adapted to seat atop of the hinge and a portion to seat behind the hinge.

5. The article of claim 2 wherein the hook is attached to the arc shaped member by a fastening means.

6. The article of claim 2 wherein the one or more magnets comprises two magnets.

7. The article of claim 2 wherein the one or more magnets are neodymium magnets.

8. An article for attachment to a hinge of a door for holding items comprising a hook for holding said items, an arc shaped member having a recessed area attached to said hook for holding said items and one or more neodymium magnets attached in said recessed area of said arc shaped member, wherein said article is adapted to attach to said hinge of a door.

9. The article of claim 8 wherein the hook includes a first hook end and a second hook end.

10. The article of claim 9 wherein the hook includes a horizontal L-shaped portion adapted to seat atop of the hinge and a portion to seat behind the hinge.

11. The article of claim 10 wherein the hook is attached to the arc shaped member by one or more screws.

12. The article of claim 11 wherein the one or more magnets comprises two magnets.

\* \* \* \* \*